(12) United States Patent
Jensen

(10) Patent No.: US 9,102,339 B2
(45) Date of Patent: Aug. 11, 2015

(54) CONTAINER-TRANSFER SYSTEM

(75) Inventor: Heine Blach Jensen, Nørresundby (DK)

(73) Assignee: BLACH HOLDING APS, Nørresundby (DK)

( * ) Notice: Subject to any disclaimer, the term of this patent is extended or adjusted under 35 U.S.C. 154(b) by 260 days.

(21) Appl. No.: 13/512,497

(22) PCT Filed: Nov. 27, 2009

(86) PCT No.: PCT/IB2009/055388
§ 371 (c)(1),
(2), (4) Date: Aug. 7, 2012

(87) PCT Pub. No.: WO2011/064621
PCT Pub. Date: Jun. 3, 2011

(65) Prior Publication Data
US 2012/0308352 A1    Dec. 6, 2012

(51) Int. Cl.
*B65G 63/02*     (2006.01)
*B61D 47/00*     (2006.01)
*B61D 3/20*      (2006.01)
*B61D 45/00*     (2006.01)

(52) U.S. Cl.
CPC ............... *B61D 3/20* (2013.01); *B61D 45/007* (2013.01); *B61D 47/005* (2013.01); *B65G 63/025* (2013.01)

(58) Field of Classification Search
CPC ...... B65G 67/00; B65G 67/02; B65G 63/025; H01L 21/677
USPC ................. 414/812, 340, 344, 392, 398, 400
See application file for complete search history.

(56) References Cited

U.S. PATENT DOCUMENTS

| | | | |
|---|---|---|---|
| 1,830,740 A | 11/1931 | Leech et al. | |
| 2,591,153 A | 4/1952 | Hodges | |
| 4,093,084 A * | 6/1978 | Ringer | 414/343 |
| 4,522,546 A | 6/1985 | Ringer | |
| 2005/0197844 A1* | 9/2005 | Ng et al. | 705/1 |

OTHER PUBLICATIONS

Written Opinion of the International Searching Authority for International Application No. PCT/IB2009/055388, Sep. 23, 2010, European Patent Office, Rijswijk, Netherlands.
International Search Report for PCT/IB2009/055388 Dated Sep. 16, 2010.

* cited by examiner

*Primary Examiner* — Saul Rodriguez
*Assistant Examiner* — Ashley Romano
(74) *Attorney, Agent, or Firm* — Stephen J. Weyer; Stites & Harbison PLLC

(57) ABSTRACT

The invention relates to the automatically transfer of a container between a flatcar (2) or the like and a transfer vehicle moving along said flatcar (2), whereby a method and a system is adapted to handle (3) both customized containers and ordinary standard containers, and it will automatically lock and unlock the freight (1) containers at the time of pulling a container between secured positions thereof.

20 Claims, 6 Drawing Sheets

CONTAINER-TRANSFER SYSTEM

FIELD OF THE INVENTION

The invention relates to a system for handling freight containers at a railroad station, a truck terminal or a harbour to facilitate their transfer between a transfer vehicle and a flatcar of a freight train, another transfer vehicle, a roadside truck and also a vessel.

BACKGROUND OF THE INVENTION

In the prior art U.S. Pat. No. 4,522,546 a system is described for transfer of containers to and from flatcars of a freight train halted on a main track, by means of sets of self-propelled transfer vehicles running on ancillary tracks in parallel with the main track, wherein said transfer vehicles are equipped with supporting arms extendable transversely to the tracks enabling movement of a selected container onto such vehicle from a flatcar aligned therewith or, vice versa, from the vehicle to the flatcar. Said supporting arms can extend half of its length to span the main track and to project underneath a container on a flatcar, whereupon the arms are elevated by jacks in order to release the container from stationary sills and to shift it together with the arms moving back on the corresponding transfer vehicle and resting on said vehicle. Moreover, the container can be transferred between transfer vehicles on neighbouring tracks, and between a transfer vehicle and a roadside truck.

Said system faces balance problems during transfer operations that are counteracted by means of railhead-gripping jaws on the transfer vehicles.

OBJECTS OF THE INVENTION

The main object of the invention is to provide a secure method and a more efficient system for automatically shifting freight containers between transfer vehicles and a freight carrier e,g a train, a truck and a vessel, requiring only a short handling time wherein such system is usable to serve as part of a container distribution system, if so desired.

It is an object of the method and the system to handle as well customized containers as ordinary standard containers.

It is a further object of the invention to provide a system to automatically lock and unlock the freight containers at the time of pulling a container between secured positions thereof.

SUMMARY OF THE INVENTION

The method according to the invention is used to automatically transfer a container between a flatcar or the like and a transfer vehicle moving along said flatcar, comprising the following steps:
  obtaining, from a computer, information on the position of a container on a specific flatcar, and of a selected transfer vehicle to receive said container,
  aligning a transfer vehicle with the flatcar, based on the position information obtained for the container to be handled, said vehicle and said flatcar being oriented in parallel on respective tracks,
  extending a gripping mechanism laterally from the vehicle into contact with receiving openings in the bottom frame of the container until contact with a preloaded locking mechanism locked in container locks is obtained,
  unlocking said container locks by activating the gripping mechanism in a release direction to release the locking mechanism,
  pulling the released container by the gripping mechanism from a first transfer surface on the flatcar laterally away from that flatcar and over to a second transfer surface on the transfer vehicle,
  positioning the container on a conveying mechanism arranged on the transfer vehicle by lowering the transfer surface or by elevating the conveying mechanism, and
  moving the container on the conveying mechanism in a longitudinal direction of the vehicle to a desired unloading location for further handling.

Said conveying mechanism can be provided as separate installations on each side of the vehicle or as installations integrated in the vehicle. A vital condition being that of providing an adjustable height difference between the second transfer surface and the upper surface of the conveying mechanism determining which surface is carrying the container at any given time.

Aligning the transfer vehicle with the flatcar is performed under guidance of position sensors provided on the transfer vehicle and position information stored in the computer. Said alignment of the vehicle is performed by a drive mechanism of the vehicle.

The locking mechanism provided in the bottom frame of the container or in a separate bottom frame for a container comprise locking bodies or hooks, which are normally preloaded to a locking position by a compression spring and capable of entering container locks arranged on a flatcar, said locking bodies being released by the gripping mechanism in order to separate the container from the flatcar prior to transferring said container.

In a preferred embodiment of the invention the gripping mechanism is formed as a kind of forklift, whereof fork arms are moved firstly in a forward direction into receiving openings in said bottom frame in order to connect with the locking mechanism thereof; next the arms are moved in a release direction, presently towards each other, whereby each locking body is released from the container locks.

In an advantageous method according to the invention the container bottom is provided with wheels, and the flatcar is provided with a first transfer surface in the form of wheel supporting rails whereby the container can be transferred laterally over the transfer vehicle to a second transfer surface provided with a set of rails thereon, and wherein the second transfer surface is lowered relative to the conveying mechanism, thereby depositing the container on said conveying mechanism and moving the container in the longitudinal direction of the transfer vehicle passing over at least one transfer vehicle.

The system according to the invention comprises a transfer vehicle moving alongside a freight train track until it has reached a position in alignment with a freight flatcar whereupon a container can be transferred between the vehicle and the flatcar. Such transfer vehicle has preferably its own drive mechanism and is equipped with extendable a gripping mechanism to engage in receiving openings in the container bottom when initiating transfer of the container from a locked position on a flatcar, followed by pulling the container from its first position to a second position on the transfer vehicle. The gripping mechanism is preferably provided with an obstructing mechanism obstructing withdrawal thereof from the openings as long as the container is in the unlocked mode. Said obstructing mechanism may be formed as protrusions or recessions on the gripping mechanism locking with the receiving openings.

In one embodiment of the invention the container is provided with transverse wheels to run on corresponding lateral rails in the floor of the flatcar and the transfer vehicle, respectively, in order to facilitate the transfer movement.

Built into the transfer vehicle or arranged on the ground in close proximity to each side of the vehicle, a conveying mechanism is provided, and provisions have been made to let said conveying mechanism protrude higher than the lateral rails on the vehicle for the container to end in a position carried by the conveyors only and to move the container by the conveying mechanism in the longitudinal direction of the main railway track to a desired location. The container may be moved over several transfer vehicles before landing on a traverse distribution track leading each container to a handling terminal of a distribution centre. The container may be pulled or pushed by any applicable mechanism along the distribution track in the terminal.

The transfer vehicle may also be configured in an embodiment allowing containers to be pulled onto the vehicle from each side thereof at the same time if required. Moreover, the transfer vehicle can transfer either one long container or up to two half-size containers (40' or 2×20') at the same time.

According to the invention a complete automatic container distribution system is suggested, wherein transfer vehicles according to the invention are used. Said system comprises a computer-supported container distribution centre and at the end of the transfer tracks a track for the containers to be moved between freight carriers e.g. trains, trucks and vessels is provided. The vessels, however, will require a crane to transfer a container between the vessel and a transfer vehicle of a container distribution system.

The automatic container distribution system could again be one of several similar systems constituting a global container distribution concept.

BRIEF DESCRIPTION OF THE DRAWING

The invention will now be described in further details and with reference to the accompanying drawing, in which.

SPECIFIC DESCRIPTION

Figure 1:
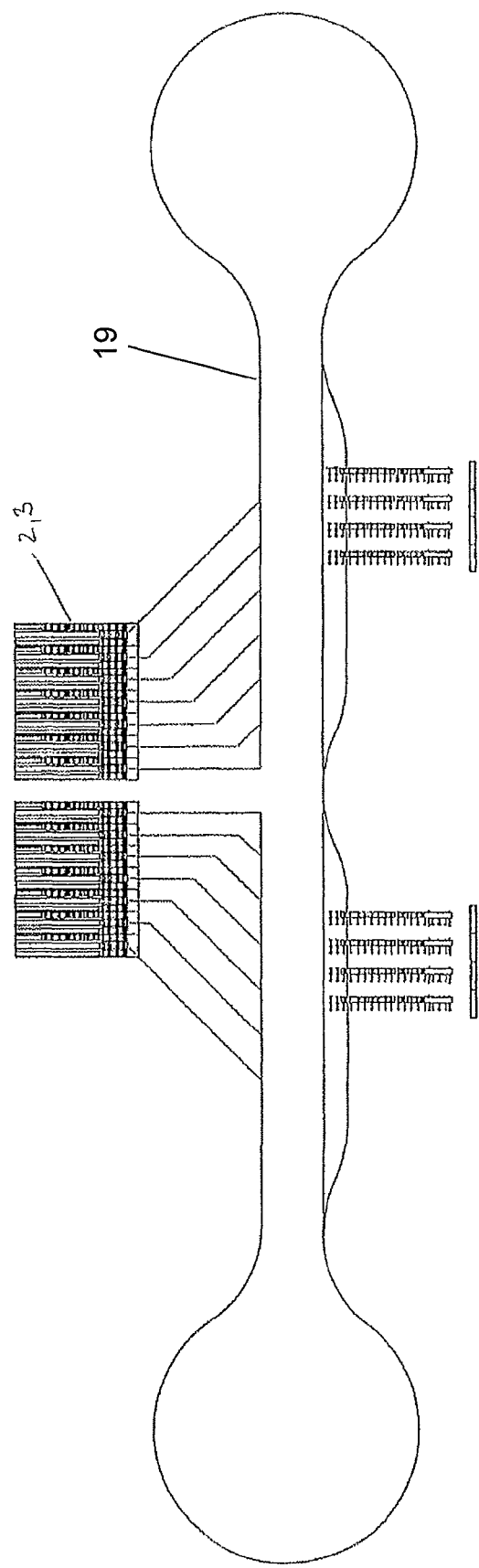
FIG. 1 shows a schematic view of a container distribution system serving land terminals and harbour terminals, respectively, wherein a container-handling system according to the invention is in use.

FIG. 1 shows a schematic view of parts of a container distribution system with clusters of flatcars 2 and transfer vehicles 3 lined up for transferring containers 1 between each other and onto a central distribution track 19 serving land terminals and at the bottom of the view there are line-ups for container-transfer to vessels in a harbour. For the sake of clarity this view does not show the containers.

Figure 2:
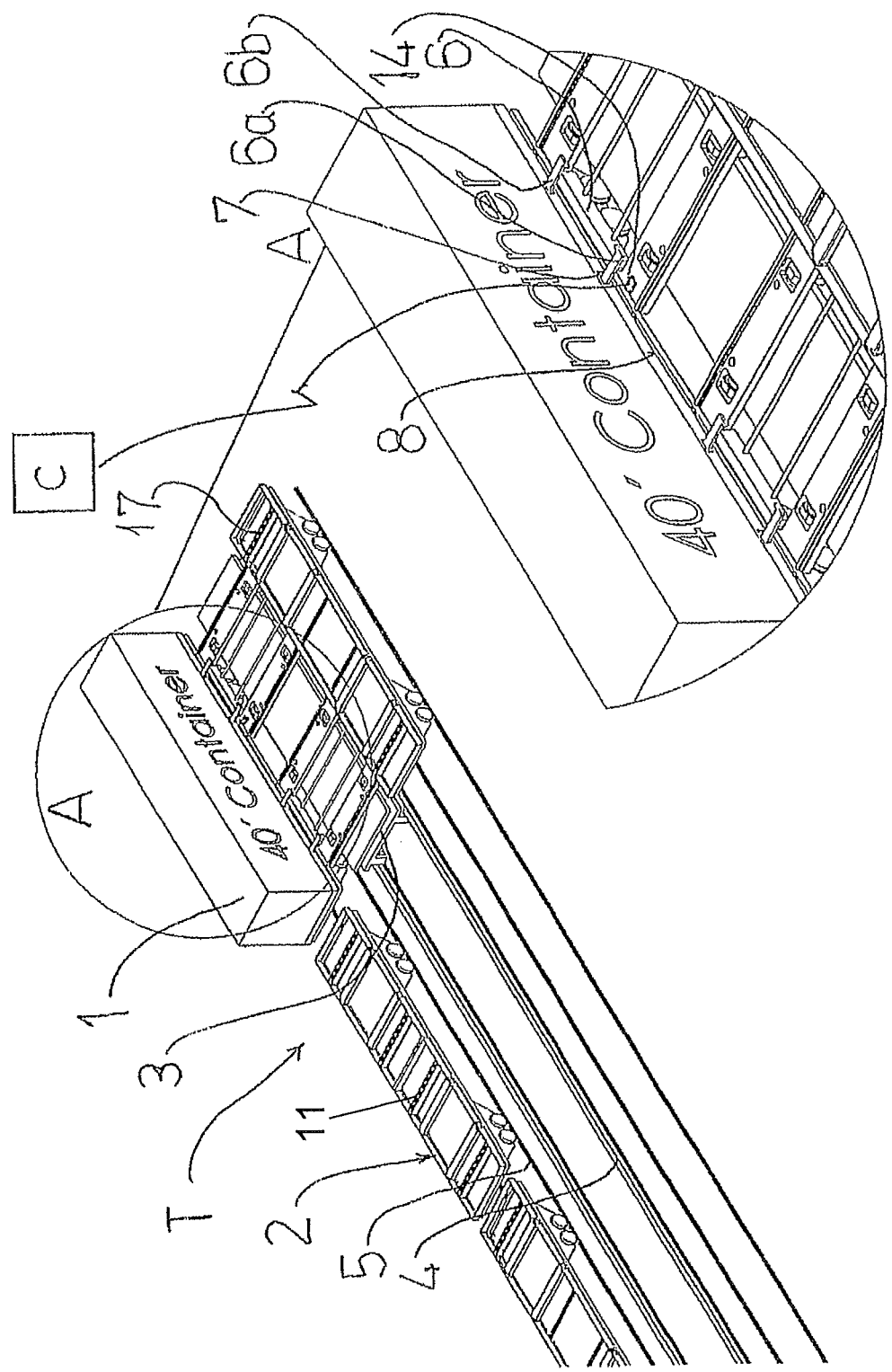
FIG. 2 shows an isometric view of a container-handling system having a container on a flatcar and a transfer vehicle running on separate tracks.

However, FIG. 2 shows two freight trains T with flatcars 2 lined up to the sides of a transfer vehicle 3, wherein a container 1 is ready to be transferred from a flatcar 2 of a freight train T on a main track 5 to a transfer vehicle 3 running on an ancillary track 4 in parallel with said main track 5. The transfer vehicle 3 is provided with at least one position sensor 14 (schematically shown in detail A) adapted to sense an adjacent flatcar 2, and then the transfer vehicle 3 is aligned with a flatcar 2 carrying a selected container 1. The position sensor 14 is communicating with a remote computer system C, wherein is stored all container data regarding i,e. the senders and the receivers so that the transport tasks can be taken care of automatically.

Figure 3:
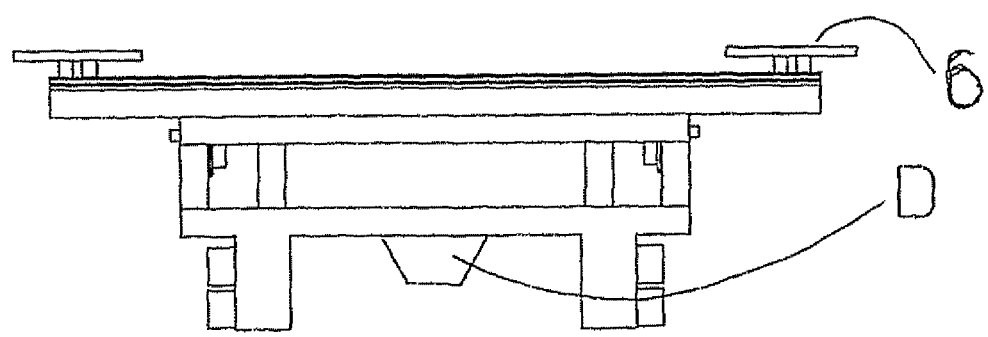
FIG. 3 shows two end views of a container-transfer vehicle according to the invention, with the transfer surface in two levels.
Figure 3:
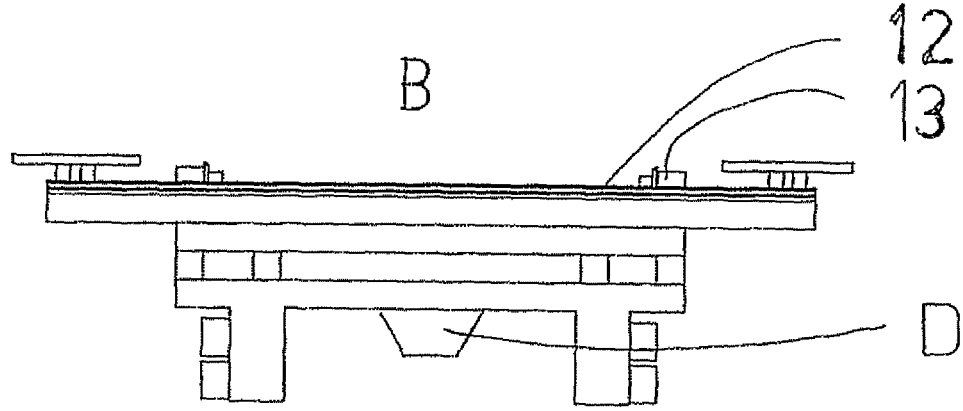

As suggested schematically in FIG. 3 the transfer vehicle 3 comprises one or more separate drive mechanisms D a. o. for said vehicle to adjust its position along the ancillary track 4 in order to align with a flatcar 2 based on controlling interaction from the computer C and the position sensor 14.

Figure 6:
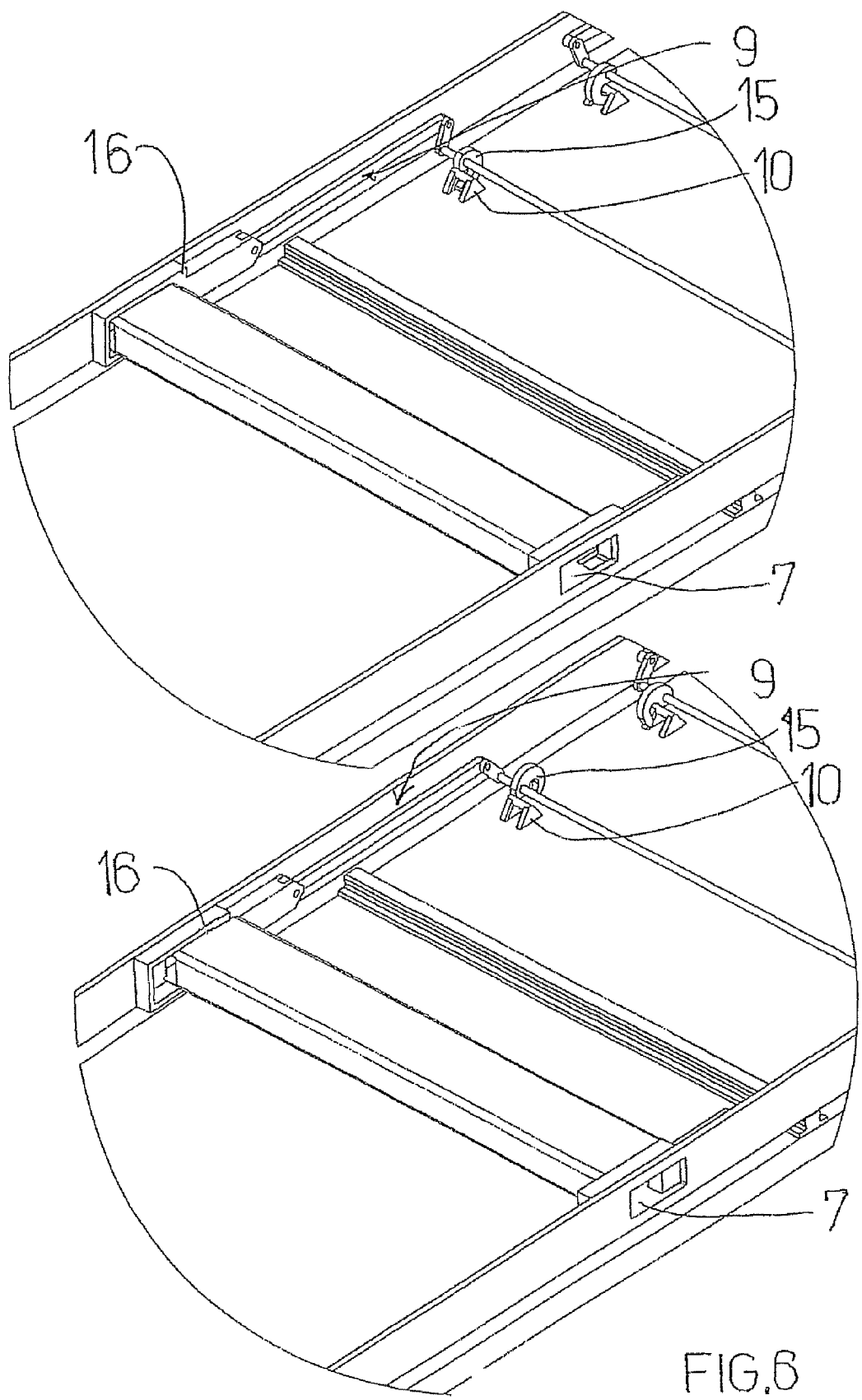
FIG. 6 shows the locking mechanism according to the invention in a locked and an unlocked state.

Furthermore in FIG. 2 and FIG. 3, the transfer vehicle 3 is equipped with a gripping mechanism 6, which by a drive mechanism D can be moved laterally into receiving openings 7 in the bottom frame 8 of a container 1 for engagement in container a locking mechanism 9 shown in FIG. 6. The gripping mechanism 6 would in a preferred embodiment be configured as a set of forklift arms 6a, 6b, wherein the distance between the arms can be narrowed or widened in order to activate the locking mechanism 9 in the form of e.g. preloaded locking bodies or hooks 15 normally in locking engagement with container locks 10 arranged on the flatcar 2. Protrusions 18 on the forklift arms 6a, 6b interact with the openings 7 in the bottom frame 8 to prohibit withdrawal from the container 1 as long as the container 1 is being pulled by said arms 6a, 6b from the flatcar 2 onto the transfer vehicle 3, whereupon the forklift arms 6a, 6b release the locking hooks 15 by adjusting the arm width and pulling out from the bottom frame 8.

FIG. 6 gives a detailed view of the access openings 7 into the locking mechanism 9 being comprised of a linkage system 16 for each forklift arm 6a, 6b and locking hooks 15, wherein the linkage system 16 is slid sideways by forklift arms (not shown) activating the locking mechanism 9 from an unlocked position in the lower view and to a locked position in the upper view by engaging the locking hooks 15 in the container locks 10 arranged on the floor of a flatcar 2. Preferably, there will be access openings 7 for forklift arms 6a, 6b at both sides of the container frame.

In order to facilitate the transfer of a container 1 between a flatcar 2 and a transfer vehicle 3 these are provided with transfer surfaces 11, 12, respectively. Said surfaces 11, 12 are configured as a set of rails in the bottom of the flatcar 2 and an elevatable surface 12 having a set of rails in the transfer vehicle 3, whereby the container bottom frame 8 is provided with sets of wheels 17 (see FIG. 2) for a container 1 to roll on the rails of surfaces 11, 12 during transfer.

In a preferred embodiment of the invention the transfer vehicle 3 comprises a conveying mechanism 13 in the form of rollers protruding vertically up through the surface 12 for actively moving a container 1 supported thereon. When the transfer surface 12 is thereby disengaging the wheels 17 of the container bottom 8 from the rails on said surface, the container 1 is moved by the rollers 13 in the longitudinal direction of the transfer vehicle 3, until reaching an unloading location in a container distribution system. Then the unloaded container 1 can be loaded again on a new flatcar, a truck or a vessel lined up next to the container 1.

Figure 4:
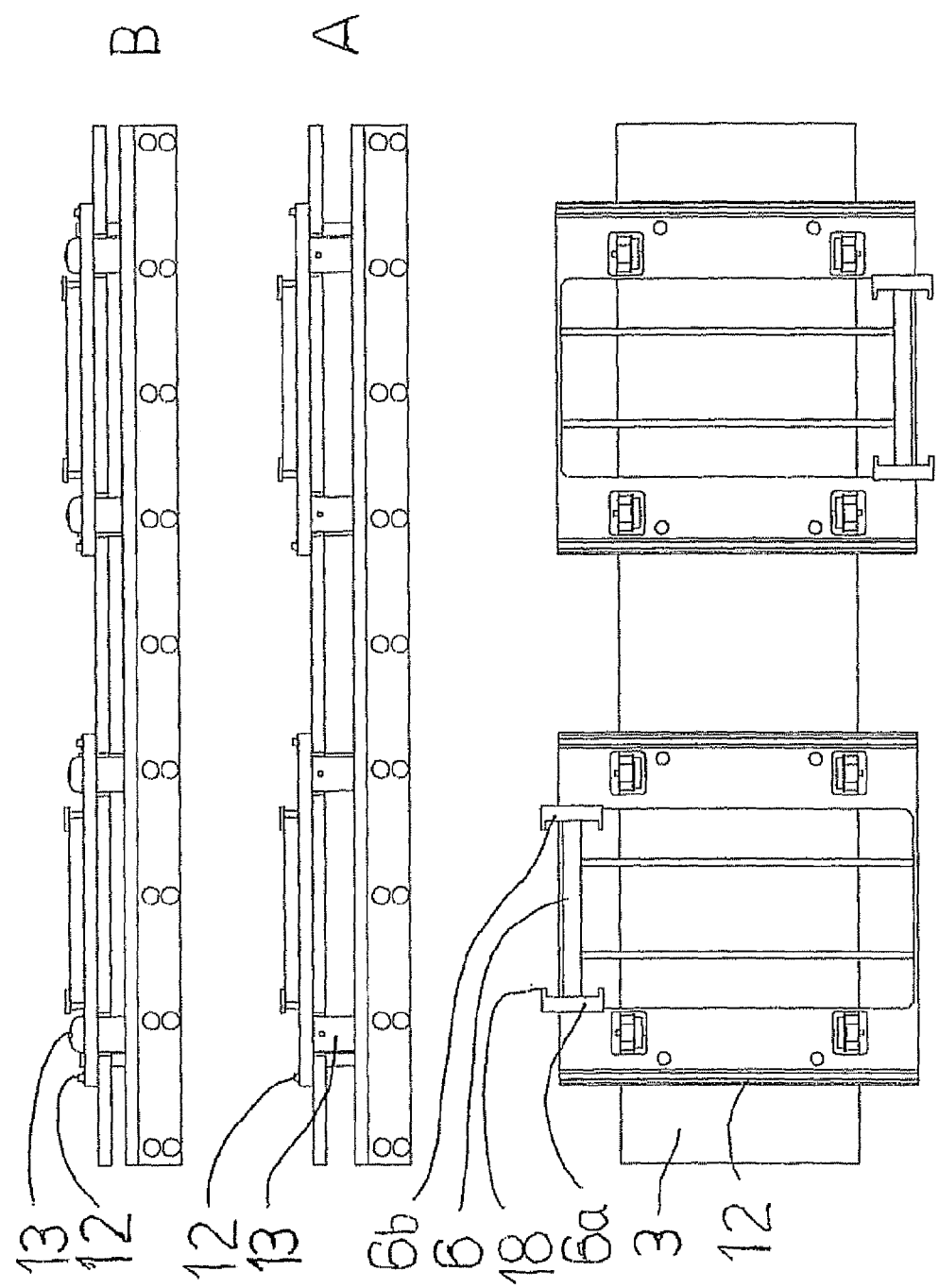
FIG. 4 shows a plan view and side views of a transfer vehicle according to the invention.
Figure 5:
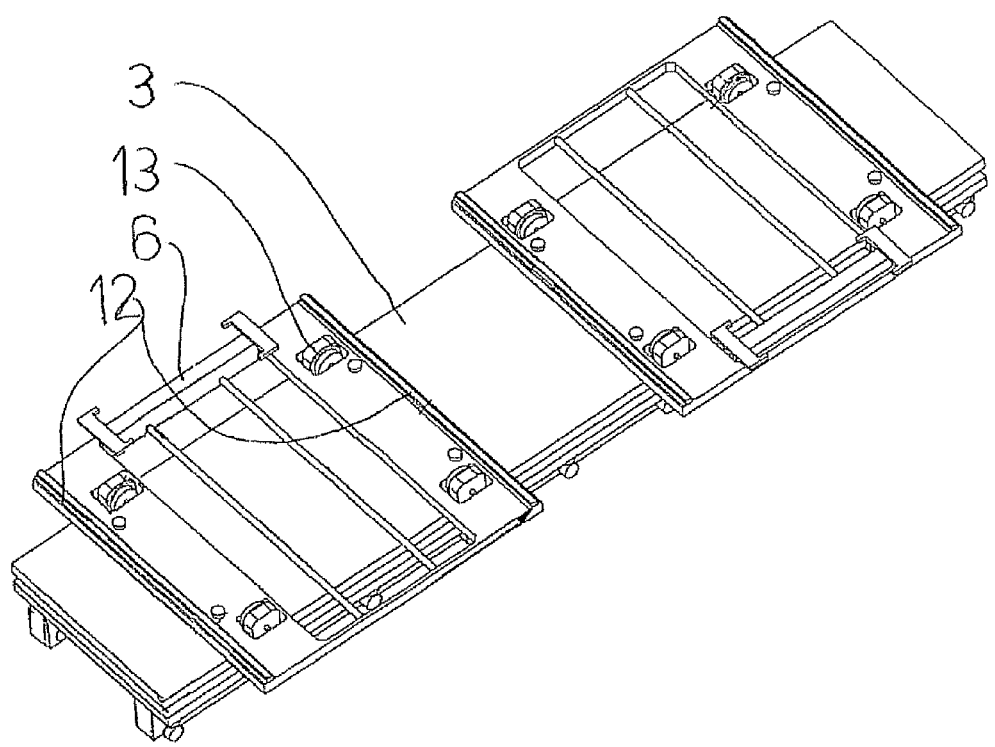
FIG. 5 shows an isometric view of a transfer vehicle with a conveying mechanism in active position.

Referring to FIG. 4 and FIG. 5 a transfer vehicle is shown having two transfer platforms or surfaces each comprising a set of rails 12, gripping mechanism 6; 6a, 6b and four conveying rollers 13. FIG. 4A shows a situation ready to carry a container resting on the rails 12, and in FIG. 4B and FIG. 5 the rollers 13 are protruding upwards past the surface level of the rails 12 and ready to move a container in the longitudinal direction of the transfer vehicle 3.

In an alternative embodiment conveying rollers 13 would be installed separately on the ground on each side of the ancillary track 4 to receive containers pulled from flatcars and to move them along, after the rails 12 are no longer engaged with the wheels 17.

In case a container 1 does not have a locking mechanism, the gripping mechanism 6 are still able to extend into receiving openings 7 and to pull back the container 1 by the gripping mechanism 6 being prohibited in withdrawal from the container 1.

The transfer vehicle 3 is provided with driving mechanism D, which can drive the vehicle 3 along the track 4 and can extend and retract the gripping mechanism 6 laterally of the transfer vehicle 3.

The transfer vehicle 3 is adapted to transfer containers 1 to/from both sides and provisions can be made for transfer vehicles lining up on each side of flatcars 2 of a freight train T.

The bottom frame 8 can be configured as an integral feature of a container 1 or it can be a separate unit on which a standard container having a plane bottom can be placed.

When a container 1 leaves the last of a row of transfer vehicles 3 it will eventually land with it sets of wheels 7 engaging rails of a traverse distribution track and an applicable pulling or pushing device will move the container 1 along said track to a next position.

The container-transfer system described above is adapted to be part of a local or global computerized container distribution system wherein containers can be loaded/unloaded between several carrier types according to information in a computer system C including destinations of containers arriving at a terminal for automatic rail/rail, rail/road or rail/vessel transfer.

The invention claimed is:

1. A method of automatically transferring a container between a flatcar and a transfer vehicle movable alongside said flatcar, comprising the steps of:
   obtaining, from a computer system, information representing the position of a container on a specific flatcar, and of a selected transfer vehicle to receive said container,
   aligning a transfer vehicle with the flatcar based on the position information obtained for the container to be unloaded, said vehicle and said flatcar moving in parallel on respective tracks,
   extending a gripping mechanism laterally from the transfer vehicle into receiving openings in a bottom frame of the container positioned on the flatcar until contact with a preloaded container locking mechanism locked in a container lock, of the flatcar, is obtained,
   unlocking the container locks by activating the gripping mechanism in a release direction to release the locking mechanism from the container locks of the flatcar,
   pulling the released container from a first transfer surface on the flatcar laterally away from the flatcar by use of the gripping mechanism and over to a second transfer surface on the transfer vehicle,
   subsequently positioning a container on the conveying mechanism arranged on the transfer surface by one of lowering the transfer surface or elevating the conveying mechanism, and
   moving the container relative to a transfer vehicle, by the conveying mechanism in the longitudinal direction of at least one transfer vehicle to a desired unloading location for further handling.

2. The method according to claim 1, wherein aligning the transfer vehicle is performed under guidance from at least one position sensor provided on the vehicle, and container information stored in the computer system.

3. The method according to claim 1, wherein the transfer vehicle moves into alignment with a flatcar by a driving mechanism on the transfer vehicle.

4. The method according to claim 3, wherein the gripping mechanism connects with the locking mechanism provided in the bottom frame of the container, the locking mechanism comprising a linkage system with locking bodies, which are normally preloaded by compression springs to lock the container and which are capable of entering container locks arranged on a flatcar, said locking bodies being released by the gripping mechanism when the container shall separate from the flatcar before transfer of said container.

5. The method according to claim 4, wherein the gripping mechanism is a forklift whereof fork arms are firstly moved in a forward direction in order to grip the container by the locking mechanism thereof, next the arms are moved in a release direction, whereby each locking body disengages a container lock, and wherein at least one of the fork arms has a protrusion prohibiting withdrawal of said arms from the receiving openings.

6. The method according to claim 1, wherein the bottom frame of a container is provided with wheels, and the flatcar is provided with a first transfer surface of wheel supporting rails whereby the container is transferred laterally over to the transfer vehicle by rolling onto a second transfer surface thereon provided with a set of rails, and wherein the second transfer surface is lowered with the container supported thereon until the container rests on the conveying mechanism of rollers now protruding upwards through the surface.

7. The method according to claim 1, furthermore comprising the step of releasing the container on the transfer vehicle and sliding the container on the conveying mechanism from vehicle to vehicle until landing across a distribution track being part of a container distribution system, and the wheels of the container bottom frame being supported on said track, while the container is rolling along said track to a required position.

8. The method of claim 1, wherein unlocking container locks by activating the gripping mechanism comprises narrowing or widening a distance between arms that comprise the gripping mechanism, to activate the locking mechanism, thereby releasing the locking mechanism from the container locks of the flatcar.

9. A container-transfer system comprising:
   a container, a transfer vehicle and a flatcar which effect a transfer of the container between the flatcar and the transfer vehicle;
   a computer system from which information is obtained representing a) a position of a container on a specific flatcar and b) a position of a selected transfer vehicle to receive said container,
   a first transfer surface on the flatcar and a second transfer surface on the transfer vehicle on which transfer surfaces the container moves laterally, one of the transfer surfaces being elevatable to receive the container thereon;
   a locking mechanism in the bottom of the container, releasably locking the container to a flatcar; and
   a gripping mechanism extends laterally from the transfer vehicle into receiving openings in a bottom frame of the container positioned on the flatcar wherein the gripping mechanism contacts a preloaded container locking mechanism locked in container locks of the flatcar, whereby moving the gripping mechanism relative to the locking mechanism in one direction, the container is released, or in the opposite direction, the container is interlocked.

10. The system according to claim 9, wherein the transfer vehicle further comprises a positioning mechanism to sense alignment with a selected flatcar, and a drive mechanism to precisely position the transfer vehicle alongside the flatcar.

11. The system according to claim 10 wherein the transfer vehicle is running on an ancillary track in parallel with a main track of a freight train.

12. The system according to claim 9,
wherein the first transfer surface is a set of rails positioned on a flatcar and oriented perpendicular to a train axis,
wherein the second transfer surface is a set of rails positioned on the transfer vehicle and in alignment with the first set of rails,
wherein said second set of rails is elevatable such that in a raised position thereof a container can be moved freely between the flatcar and the transfer vehicle, while in a lower position thereof the container rests on conveyors provided to each side of the longitudinal direction of said vehicle after losing contact when the second set of rails as lowered.

13. The system according to claim 12,
wherein wheels to run on the first and second set of rails are provided at the bottom of the container,
wherein a top of the first set of rails is flush with a floor surface of a corresponding flatcar, and
wherein the second set of rails can be lowered to a level relative to the first set where the wheels do not have contact with the second set of rails, and consequently the container can be moved in the longitudinal direction with a conveying mechanism.

14. The system according to claim 13, wherein the conveying mechanism consists of rollers.

15. The system according to claim 13, wherein said wheels are mounted in an ancillary bottom frame of the container adapted to receive and support a standard container.

16. The system according to claim 9,
wherein the flatcar is provided with standard container locks for the container which engage preloaded locking bodies of the container, and
wherein the gripping mechanism comprises forward extending arms adapted to release the locking bodies by being forced in a release direction and overcoming a locking force on said locking bodies.

17. The system according to claim 9, further comprising:
a conveying mechanism, and
wherein at least one of (i) the conveying mechanism is adapted for movement to be elevated and (ii) the transfer surface is adapted for movement to be lowered, to thereby position the container on the conveying mechanism.

18. The system according to claim 17, wherein the conveying mechanism is adapted to move the container relative to the transfer vehicle in the longitudinal direction of at least one transfer vehicle to a desired unloading location for further handling.

19. The system of claim 9, wherein the gripping mechanism is adapted to pull a released container from a first transfer surface on the flatcar laterally away from the flatcar and over to a second transfer surface on the transfer vehicle.

20. The system of claim 9, wherein the gripping mechanism comprises arms movable, relative to each other, to narrow or widen a distance therebetween, towards and away from each other, and wherein, activating the gripping mechanism comprises narrowing or widening a distance between arms, to activate the locking mechanism, thereby release the locking mechanism from the container locks of the flatcar.

* * * * *